Jan. 13, 1970     P. J. HUNCKLER ET AL     3,489,312
PLUG FOR OIL PAN OPENINGS AND THE LIKE
Filed May 3, 1968
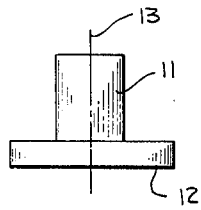
Fig. 1.
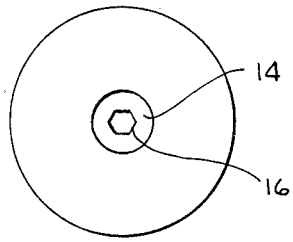
Fig. 2.
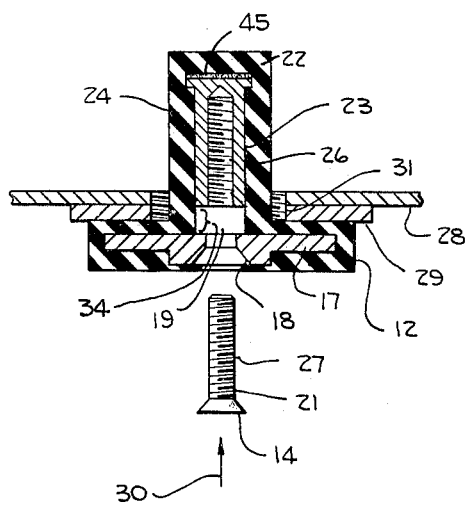
Fig. 3.
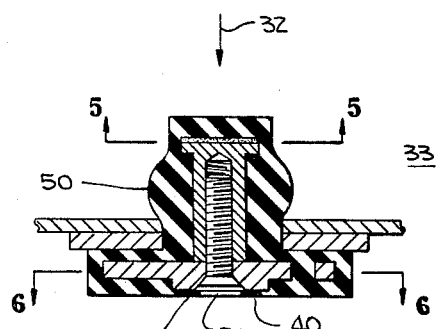
Fig. 4.
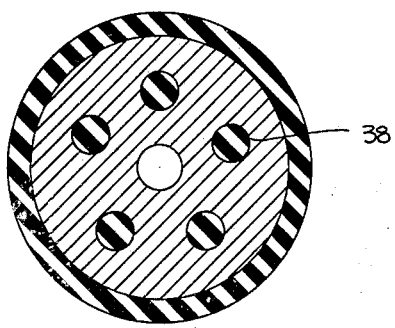
Fig. 6.
Fig. 5.
INVENTORS
PAUL J. HUNCKLER
GEORGE M. KEEFE
BY
Woodard, Weikart, Emhardt & Naughton
Attorneys United States Patent Office 3,489,312
Patented Jan. 13, 1970

3,489,312
PLUG FOR OIL PAN OPENINGS
AND THE LIKE
Paul J. Hunckler, Roanoke, and George M. Keefe, Huntington, Ind., assignors to Hunckler Products, Inc., Roanoke, Ind., a corporation of Indiana
Filed May 3, 1968, Ser. No. 726,306
Int. Cl. B65d 39/12, 45/02; F16d 13/06
U.S. Cl. 220—24.5                                5 Claims

ABSTRACT OF THE DISCLOSURE

A neoprene plug expanded into sealing engagement with a threaded wall circular drain aperture in an oil pan of an engine, transmission, or other device, the expanded sealing condition being maintained by a screw threadedly received in a nut embedded in the plug, the screw having a flat head supported by a washer embedded in a flange of the plug.

BACKGROUND OF THE INVENTION

Field of the invention

This invention relates generally to plugs for holding fluids in containers, and more particularly to such a plug which is readily removable and replaced for a reliable seal in an opening.

Description of the prior art

Known prior art includes the United States Patents No. 3,307,731 issued Mar. 7, 1967 to Harry Seltzer, and No. 3,365,093 issued Jan. 23, 1968 to William P. Malenke, as well as the prior art cited in those patents.

The device as shown in the Seltzer patent requires two tools for installation, one for holding the plug and the other for turning a bolt in it. Once the plug is located in the opening, the bolt must be withdrawn in order to establish the seal, and it should be removed completely in order to avoid its falling out and resulting loss. Then there is the problem of keeping it in a place where the serviceman will be able to find it for use in order to remove the plug for draining a crank case. The Malenke patent shows a device wherein the nut is disposed on the outside part where threads can be contaminated and where it is exposed to inadverent bumping. The present invention solves the problems involved in the use of prior art plugs.

SUMMARY

Described briefly, in a typical embodiment of the present invention, a cylindrical body of an axially compressible, radially-expandable material is provided with an integral flange extending radially outward therefrom. A nut is received in the body adjacent the end opposite the flange, and a washer is received in the flange. The outer face of the washer is countersunk at a central aperture to receive a flat head screw which is threadedly received in the nut. The body is inserted in the opening to be plugged, whereupon the screw is tightened and the body expanded to seal the opening. The head of the screw is slightly recessed with respect to the outer surface of the washer, to avoid any contamination thereof and avoid interference thereof with any external hazards, such as road surfaces, for example.

BRIEF DESCRIPTION OF THE DRAWING

FIGURE 1 is an elevational view of a typical embodiment of the present invention.

FIGURE 2 is a plan view thereof looking at the flange end.

FIGURE 3 is a cross section through an oil pan at the drain plug opening and showing in section a plug ready to be tightened and expanded in the opening, the annular space being exaggerated for illustrative purposes.

FIGURE 4 is a section after the plug has been expanded and secured in place.

FIGURE 5 is a section taken at line 5—5 in FIGURE 4 and viewed in the direction of the arrows and illustrating the anti-turn features in the nut flange.

FIGURE 6 is a section taken at line 6—6 in FIGURE 4 and illustrating the anti-turn features in the body flange reinforcing washer.

DESCRIPTION OF THE PREFERRED EMBODIMENT

Referring now to the drawings in detail, the plug of the illustrated embodiment includes a cylindrical body portion 11 and radially extending flange portion 12 at one end thereof, the body and flange being an integral homogeneous unit of some elastomer such as neoprene, for example. Other materials might be used as well. The body has an opening in the flange end on the axis 13 thereof and a flat headed screw is received therethrough, the head 14 of the screw being provided with a tool receiving recess which, in the illustrated embodiment, is a hexagonal Allen socket 16.

As shown in the cross section in FIGURE 3, a washer 17 is provided in the flange and extends to a point near the outer marginal edges thereof, the washer being embedded in the body of the material and thereby precluded from rusting. Only the countersunk surface 18 at the aperture 19 is exposed to the exterior and, when the screw 21 is installed, the head 14 thereof rather completely covers the countersunk surface.

The inner end 22 of the body is closed and a nut 23 is embedded in the body with a radially extending flange 24 of the nut located near the closed end 22. The nut is internally threaded at 26 for receiving the shank 27 of the screw.

A typical oil pan drain provision is illustrated wherein the lower surface or wall 28 of the oil pan has a reinforcement plate 29 spot welded thereto, the member 29 being internally threaded at 31 to receive the usual threaded oil pan plug. The internal edge of the aperture in the oil pan can be likewise threaded, if desired. The plug of the present invention can seal quite adequately on such surfaces or on smooth bores as well, and shapes other than the cylindrical body shown can also be provided and apertures of other than circular shapes can be plugged by plugs made according to the present invention.

In the embodiment as illustrated in FIGURE 3, the diameter of the body is shown to be noticeably smaller than that of the aperture in the oil pan and the purpose of showing it exaggerated this way is to point out that there is a clearance normally provided and sufficient to readily insert the plug, and to remove it later, when desired, for draining the pan.

To install the plug, all that is needed is to insert it to the position shown in FIGURE 3 whereupon the flange 12 serves as a stop to prevent the plug from passing into the oil pan. Then the screw 21 is turned into the nut 23. Axial force applied by the Allen wrench in the direction of arrow 30 urges the large area of the upper face of the flange against the lower face of the plate 29, and the friction of these abutting faces prevents rotation of the flange and plug body. Therefore it is not necessary to use a tool or other means to prevent plug rotation.

Turning screw 21 pulls the nut in the direction of the arrow 32 toward the exterior, and the lower face of the nut flange 24 bears on the material of the body to axially compress it. During the axial compression, the body radially expands into tight fitting sealing engagement with the oil pan aperture to seal the fluid at 33 inside the pan.

A securely sealed effect is presented by the generation of annular "bubble" 50 at the edge of the aperture. Likewise the plug is secured in the opening.

In order to provide a good indicator of a satisfactory installation, and prevent excessive pulling of the nut toward the exterior, radial clearance between the screw shank and plug body throughout the axial distance at 34 between the lower edge of the nut cylinder and the upper face of the washer 17 can be such that as the screw is turned, the space becomes completely closed by the nut cylinder and it engages the washer when the plug has been satisfactorily expanded in the opening. Note that when the screw is completely installed, the head thereof is almost flush at 36 with the outer face 35 of the flange. However it is partially covered by annular lip 40 of the flange so that, later on when the plug is to be removed for draining the pan, the lip can retain the screw in the plug to keep it from falling out, and can serve as an indicator so it will not be unscrewed farther than necessary to release the plug.

In order to prevent rotation of the nut 23 in the body as the screw is turned for installation, a plurality of circularly spaced radially extending notches 37 can be provided in the flange, and when the plug is molded, the rubber of the body molds through these recesses to prevent rotation of the nut in the body. However a preferable construction is to provide a vulcanizing fluid or adhesive at 45 on the upper face of the nut, which adheres the nut to the body during the curing process.

Rotation of the washer in the body will not normally occur. If it did, a plurality of apertures 38 could be provided, to receive rubber therein. Variations of anti-turn means can be provided if desired, in the nut and washer, and it is expected that if adhesive is not used, such provisions would involve surfaces transverse to circles concentric with the axis 13, one example of such surfaces being the radially extending surfaces provided by the notches in the flange as best shown in FIGURE 5.

It is believed that from the foregoing description it will be apparent that the present invention is a patentable advance.

While the invention has been disclosed and described in some detail in the drawings and foregoing description, they are to be considered as illustrative and not restrictive in character, as other modifications may readily suggest themselves to persons skilled in this art and within the broad scope of the invention.

The invention claimed is:
1. A plug comprising:
an elongated body of axially-compressible radially-expandable material, said body having an opening in one end thereof, said body being receivable in an aperture to be plugged in a wall of a member;
a nut embedded in said body near the end opposite the end having said opening therein;
stop means engageable with a surface of said wall adjacent said aperture to prevent passage thereof through said aperture;
a screw having a shank threadedly received in said nut and having a head supported by said stop means;
said screw being rotatable in said nut for axially compressing and radially expanding said body to secure it in said aperture;
said stop means including a radially extending flange and having a reinforcing member embedded therein;
said flange having a face thereof engaging a face of said wall and establishing friction therebetween sufficient to prevent rotation of said body in said aperture during rotation of said screw, said flange also having a lip thereon overlying a portion of said screw head.

2. A plug comprising:
an elongated body of axially-compressible radially-expandable material, said body having an opening in one end thereof, said body being receivable in an aperture to be plugged in a wall of a member;
a nut embedded in said body near the end opposite the end having said opening therein;
stop means engageable with a surface of said wall adjacent said aperture to prevent passage thereof through said aperture;
a screw having a shank threadedly received in said nut and having a head supported by said stop means;
said screw being rotatable in said nut for axially compressing and radially expanding said body to secure it in said aperture;
said stop means including a flange with a washer therein;
said screw being a flat headed screw;
said washer being countersunk to receive said screw head for a substantially flush relationship of said screw head to said flange; and
said flange having a lip thereon overlying a portion of said screw head.

3. The plug of claim 2 wherein:
said washer has a plurality of circularly spaced apertures therein receiving the material of said body therethrough and preventing rotation of said washer in said flange,
and said nut has a flange thereon with radially extending surfaces engaging said body material and preventing rotation of said nut in said body.

4. The plug of claim 2 wherein:
said screw head has an Allen wrench receiving socket therein, and said body is cylindrical.

5. The combination comprising:
a lubricant reservoir member having an aperture therein exposed to lubricant;
a stopper having a body received in said aperture and an integral flange preventing passage of said stopper entirely through said aperture;
a nut in said body;
a screw threadedly received in said nut and having a tool receiver exposed at the exterior of said reservoir member;
said screw holding said nut in a body expanding position, sealing said body in said aperture to prevent passage of lubricant through said aperture, said flange having a lip overlying the end of said screw around said tool receiver.

References Cited

UNITED STATES PATENTS

| 2,072,426 | 3/1937 | Kraft. | |
| 2,439,628 | 4/1948 | Kopecky | 215—54 |
| 2,533,715 | 12/1950 | Conklin et al. | 220—24.5 |
| 2,566,816 | 9/1951 | Work | 220—24.5 |
| 2,923,323 | 2/1960 | Franck | 220—24.5 X |
| 3,307,731 | 3/1967 | Seltzer | 220—24.5 |

JOSEPH R. LECLAIR, Primary Examiner

J. R. GARRETT, Assistant Examiner

U.S. Cl. X.R,

85—70